US009722978B2

(12) United States Patent
Morss et al.

(10) Patent No.: US 9,722,978 B2
(45) Date of Patent: Aug. 1, 2017

(54) SYSTEM AND METHOD FOR AUTOMATED LICENSING IDENTIFICATION AND VERIFICATION

(71) Applicant: LEOPONA INC., Seattle, WA (US)

(72) Inventors: Charles Hughes Morss, Seattle, WA (US); Brent D. McCrossen, Jefferson, LA (US); Jennifer Joy Anderson Miller, Seattle, WA (US); Romain Beauxis-Aussalet, New Orleans, LA (US)

(73) Assignee: Lidcore, Inc., New Orleans, LA (US)

( * ) Notice: Subject to any disclaimer, the term of this patent is extended or adjusted under 35 U.S.C. 154(b) by 0 days.

(21) Appl. No.: 14/221,002

(22) Filed: Mar. 20, 2014

(65) Prior Publication Data

US 2014/0289873 A1    Sep. 25, 2014

Related U.S. Application Data

(60) Provisional application No. 61/804,530, filed on Mar. 22, 2013.

(51) Int. Cl.
*H04L 29/06* (2006.01)
*G06F 21/10* (2013.01)
(52) U.S. Cl.
CPC .......... *H04L 63/0442* (2013.01); *G06F 21/10* (2013.01); *H04L 2463/103* (2013.01)

(58) Field of Classification Search
CPC ............... G06F 21/10; H04L 2463/103; H04L 2209/608
USPC .......................................................... 726/30
See application file for complete search history.

(56) References Cited

U.S. PATENT DOCUMENTS

| 2002/0124024 | A1* | 9/2002 | Patterson | G01C 11/00 715/202 |
| 2003/0069853 | A1* | 4/2003 | Bryant | G06F 21/10 705/59 |
| 2003/0140009 | A1* | 7/2003 | Namba | H04N 7/165 705/59 |
| 2006/0156003 | A1* | 7/2006 | Zhang | H04N 1/32144 713/176 |
| 2013/0312112 | A1 | 11/2013 | Trolano et al. | |

* cited by examiner

*Primary Examiner* — Jason K Gee
(74) *Attorney, Agent, or Firm* — Davis Wright Tremaine LLP; Michael J. Donohue (57) ABSTRACT

A system for license identification and verification uses watermarking technology to embed license information in the medium itself. Various techniques for the creation of the license are described. The Platform on which the media will be used can extract the watermark data and thereby identify and verify the license. The watermark data includes a certain minimal amount of license data. If further information is required, the Platform can use the watermark data to request additional license details from a Licensor or from a license server. Using this approach, the Platform can readily identify and verify that the media in its possession is properly licensed.

9 Claims, 5 Drawing Sheets

SYSTEM AND METHOD FOR AUTOMATED LICENSING IDENTIFICATION AND VERIFICATION

BACKGROUND OF THE INVENTION

Field of the Invention

The present disclosure is directed generally to licensing and, more specifically, to a system and method for the automated licensing identification and verification.

Description of the Related Art

Digital media is licensed for a number of reasons, but oftentimes it is for use in a derivative work by a content creator (e.g., a song for use in a video). It is usually the responsibility of the entity that is offering these derivative works for general consumption (e.g., a video hosting Platform), to assure these works are licensed correctly. Assuring proper licensing involves verifying adherence to the licensing terms of the music, image, etc, used to create these derivative works.

Until now, a primary means of verifying the content of these derivate works has been using a technique known as fingerprinting. Fingerprinting, which is not used in this invention, can detect if a particular audio track exists within a video, and provide the name of the artist and the song. However, a fingerprint cannot determine the actual licensing terms of the audio track (i.e., was it licensed for use in a particular work by a particular individual or organization).

Therefore, it can be appreciated that there is a significant need for an automated technique to identify and verify media licenses. The present disclosure provides this, and other advantages, as will be apparent from the following description and accompanying figures.

DETAILED DESCRIPTION OF THE INVENTION

The present disclosure details the use of watermarking to explicitly define and determine the complete license details. This has the desired effect of removing the ambiguity associated with fingerprinting. And by removing this ambiguity, content creators who have correctly licensed media will no longer have their derivative works called into question. Using the techniques described herein, the license can be discovered directly from the derivative work. The process may be referred to herein as a License Identification (LID) process.

A media Licensor collects or creates license information and sends it to a License Server, or license verification entity, where a unique digital watermark is generated and returned to the Licensor. The present disclosure is not dependent on the exact technique for digital watermarking of the media. However, the technique selected for use must permit the addition of the digital watermark to media in a manner that is not detectable by unaided human senses. That is, the digital watermark must not be audible to human ears in an audio file, such as a musical track, while still being capable of detection by a computer implementing the watermarking technology. Similarly, a digital watermark in an image or video file must not be visible to the human eye. The watermarking technique must also be robust to a certain degree. A digital watermark is considered robust with respect to transformations if the embedded information can be reliably detected from the watermarked signal even if degraded by a number of transformations. For example, a digital audio file may be converted from a lossless format, such as WAV, to a format that degrades the audio signal, such as MP3, or introduces some degree of noise. The selected digital watermarking process must be sufficiently robust to withstand such transformations and still have the digital watermark information be recoverable from the transformed data file.

This watermark is comprised of bytes that directly translate into some of the public attributes of the license agreement. These can include, but are not limited to, bit masks and/or bit flags to represent the media rights granted in the license. Such data can include the term of the license agreement, whether or not the license grants worldwide distribution and the license type (e.g., personal use, advertising use, and the like). It is also comprised of bytes that make it unique within the License Server's repository. The Licensor then watermarks the medium and distributes the medium to Licensees, who then will typically use that medium to create a derivative work, such as using a licensed audio track when creating a video.

At a later date the Licensee then distributes their derivative work to a Platform. A "Platform," as used here, refers to the entity that performs the license verification process. As those skilled in the art can appreciate, the Platform can be the entity that publishes the derivative work along with the digital watermark or a third party monitoring service. For example, the derivative work can be a video uploaded to a video hosting service for public release in an appropriate format. In this example, the video hosting service may publish the derivative work online as a multimedia data file, make it available for download from a website, or the like. Alternatively, the derivative work can be transmitted via conventional broadcast radio or television. In yet another alternative, the derivative work can be published by distribution via cable network, satellite broadcast, and the like. Thus, those skilled in the art will appreciate that the publication of the derivative work can be accomplished in many different formats, all of which are intended to be covered by the present disclosure. At this time it is often the responsibility of the Publishing Platform to assure that the uploaded video, including any media contained within that video, is licensed correctly. This, the Platform in this embodiment has a publication function and a verification function. The Platform extracts the watermark(s) from the video and can inspect these bytes to determine any public attributes of the license agreement. The Platform can also interact with the License Server to discover more licensing details. During this interaction the original Licensor can be notified that this particular Platform has "discovered" a particular licensed medium.

In yet another alternative, the Platform can be a monitoring service operated by the Licensor, License Server, or some third party monitoring service. In this embodiment, the Platform has a monitoring and verification function rather than a publication and verification function. Although the Platform performs a monitoring function, the operational details regarding extraction of the digital watermark, verification of the data contained therein, request for additional licensing information, notification of a "discovered" licensed medium to the Licensor, and the like are performed in a similar fashion whether the Platform is a publishing Platform or a monitor Platform.

The techniques described herein are designed to provide basic or essential license information within the digital watermark itself. In many cases, the Platform can derive all the critical aspects of the media license based solely on the information contained within the digital watermark. However, the techniques also provide for progressive license information discovery. Depending on the particular application, the Platform can access additional license information. As described above, the digital watermark provides a number of pieces of license information. At a first level, the Platform can extract any of the license information that is encoded directly in the digital watermark. The advantage of this approach is that much of the license information can be extracted by the Platform without the need to interact with the License Server.

To discover additional license information, the Platform can use the digital watermark to query the License Server for additional information. As noted above, the digital watermark data also includes information that uniquely identifies the particular license. This identification information can be used during communications with the License Server to discover the additional license derail. Such information may include, but is not limited to, information about the Licensee, the works to which the license applies, and information on the particular media being licensed, such as an audio track name, international standard recording code (ISRC), artist name, and the like.

In yet another level of progressive license discovery, the Platform can request the actual license documents from the Licensing Server. These documents are typically the actual legal documents between the Licensor and the licensee that describe all rights and restrictions granted in the license. Portions of the license information returned from the license Server in response to Platform queries may be encrypted by the Licensor. The Platform can optionally decrypt this information to gain further details.

Thus, the system provides basic license information within the digital watermark itself. In many cases, this information is sufficient for the Platform to identify and validate the license. However, the system does provide for further license information discovery, as described above.

A secondary workflow is also supported, in which Licensors may need to distribute media to Licensees prior to an actual licenses being secured. In this case the Licensor requests a watermark from the License Server. The License Server does not store license information at this time, but generates a watermark that is used to identify this particular medium. The Licensor then watermarks and distributes medium to the Licensee. At a later time, once a license has been secured, the Licensor sends the license details to the License Server. The Licensor then issues a request to the License Server to add prior watermarked media to the newly created license agreement. Once the Licensee has distributed/uploaded media, this workflow continues with the Platform extracting the watermark as described above.

Figure 1:
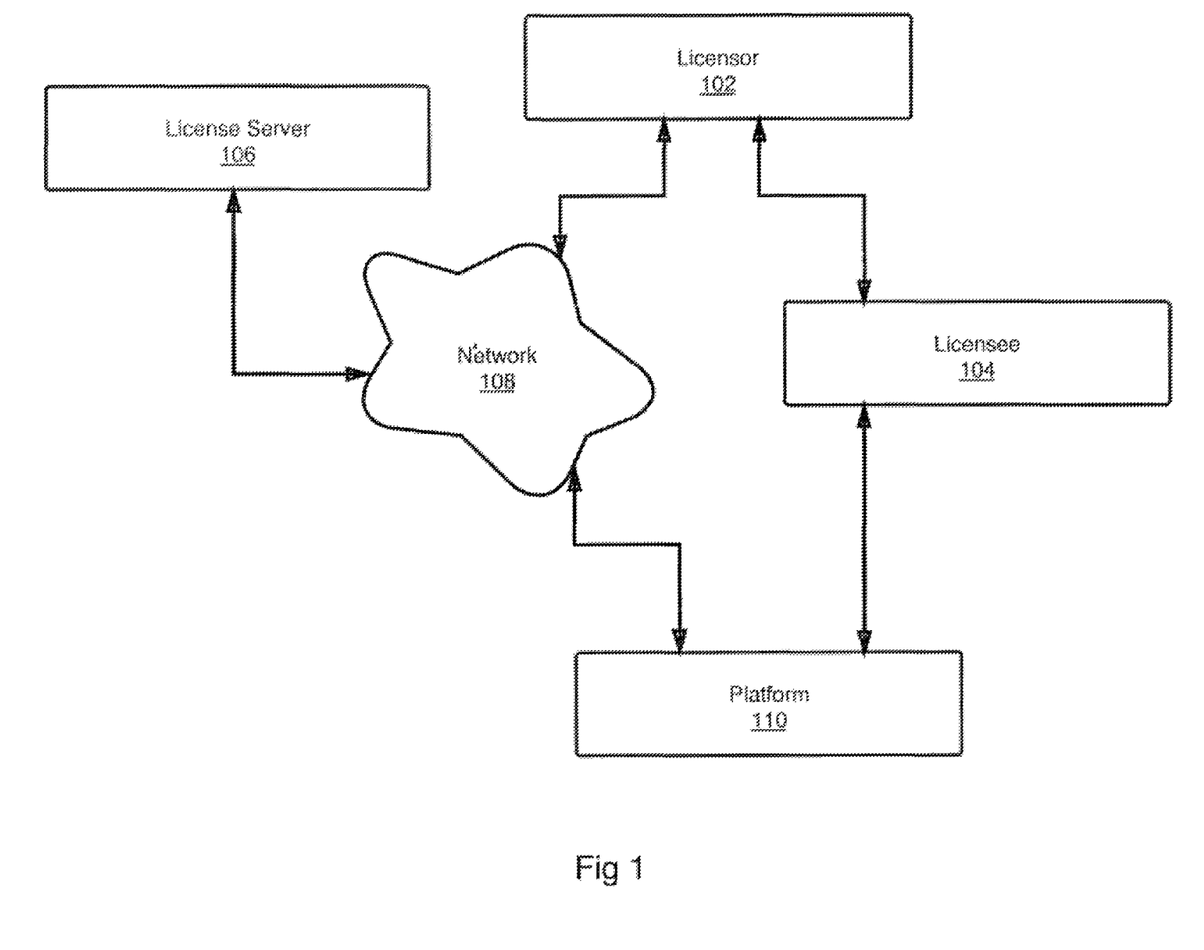
FIG. 1 illustrates a typical network architecture suitable for implementation of the automated licensing identification and verification system.

FIG. 1 illustrates a network architecture configured to implement the LID system 100. For a more complete understanding, it will be helpful to provide the following definition of roles by various components or entities that are illustrated in FIG. 1.

A Licensor 102 is a provider of licensed media to Licensees 104. The Licensor 102 interacts with a License Server 106 via a computer network 108, with Licensees 104, and with the system's 'LID Encoder' software. In an exemplary embodiment, the network 108 may be implemented as a wide-area network, such as the Internet.

A Licensee 104 is a party using licensed media to redistribute as is, or to create and distribute a derivative work, such as adding a musical track to a video production. The Licensee 104 interacts with the Licensor 102. The communication between the Licensor 102 and the Licensee 104 may be direct or via the network 108.

A License Server 106, sometimes referred to as a license verification entity, is a coordinating entity and repository for licensing information.

A Platform 110 represents one or more entities that need to determine the licensing of a particular piece of media or a derivative work derived therefrom. For example, the Platform 110 could be a radio station, television station, or the like that may broadcast, publish, or disseminate the media or derivative work and needs to verify the license status of the media. The Platform 110 may interact with the License Server 106 via the network 108 and the system's 'LID Decoder.'

Figure 2:
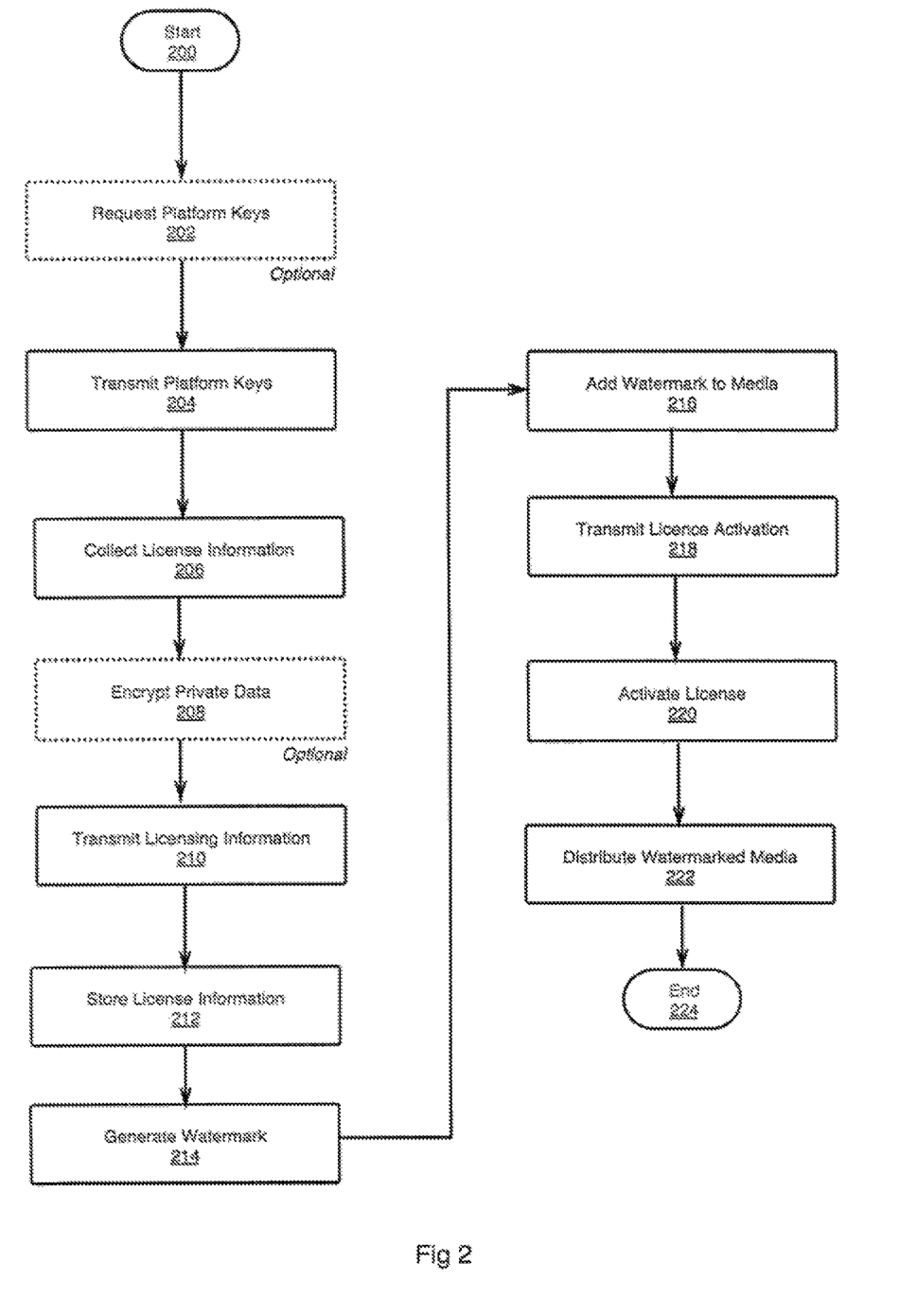
FIG. 2 shows a typical process by which a Licensor interacts with the invention to store a license for later retrieval by one or more Platforms.

FIG. 2 shows a typical process by which the Licensor 102 interacts with the invention to store a license for later retrieval by one or more Platforms 110. Those skilled in the art will appreciate that there are optional steps in this process and the steps need not always follow this exact sequence. The decision to execute optional steps needed for encryption is made by the Licensor 102 depending on the desired degree of privacy and security.

The process begins at a start 200 and the Licensor 102 optionally makes a request 202 to the License Server 106 to transmit Platform keys in step 204. Platform keys are typically the public half of an OpenPGP key pair. OpenPGP is only one possible embodiment of the encryption algorithm used by the system 100. This interaction does not need to be performed for every license the Licensor 102 wishes to store. The Platform keys can be cached by the Licensor 102 as they typically rarely change.

In one embodiment, the Licensor 102 collects license information in step 206 for a license to be issued to a Licensor. This can include, but is not limited to, the medium being licensed, the license classification, such as, but not limited to, rights granted, restrictions, term, etc. and additional supporting documents.

Certain license attributes are public and required (i.e., non-encryptable), which allows Platforms 110 to determine a minimal set of license attributes. Other license attributes may be considered private and optionally encrypted in step 208 using the public OpenPGP key pairs for all Platforms to which the Licensor 102 wishes to expose the private encrypted license attributes. Non-required license attributes may be made private by the Licensor 102 without the need to encrypt. Private, non-encrypted attributes are only made available by the License Server 106 to the Platforms 110 specified by the Licensor 102. No decryption is needed by the specified Platforms 110 to see private data in this case. Encrypting for specific Platform consumption is an extra layer of security that is available should the need arise. When encryption is performed in this manner, the encrypted attributes can only be decrypted by the specified Platform(s) 110. The License Server 106 cannot decrypt these attributes since the private OpenPGP key is needed to decrypt and only the specified Platform(s) 110 have that private key. This key pair generation and storage process is described later.

The Licensor 102 then transmits the license information to the License Server 106 via the computer network 108 in step 210. In step 212, the License Server 106 stores this information in a database or other conventional data storage data structure.

The License Server 106 then generates a series of bytes to use as a digital watermark. This is known as a LicenseID (LID). This watermark is generated by using, but not limited to, IDs and masks to represent the required license attributes (e.g., license term, media rights granted, license type, distribution rights, and the like), a Licensor ID (or group ID), version, error detection bits, and an exclusive ID to assure uniqueness of the LID.

The exact byte arrangement in the LID is dependent on the actual embodiment. Since the watermark contains actual data, instead of being used entirely as an index into a database, Platforms 110 can determine particular license rights without having to issue a request to the License Server 106 via the network 108.

In step 214, the watermark is generated in the manner described above and transmitted back to the requesting Licensor 102.

In step 216, the Licensor 102 adds the watermark to any media covered by the license agreement with the Licensee 104. The actual watermarking technology used may vary from one embodiment to another, depending on the type of media that is being licensed. While the examples presented herein refer to a licensed audio track that may be embedded or used in a video track, those skilled in the art will appreciate that the system 100 is applicable to any electronic data that may be in the form of audio, digital images, video, and the like. The system 100 is not limited to licensing of audio tracks. Those skilled in the art will appreciate that the watermark for an audio track may be different from a watermark in a digital image or the watermark in a video dip.

In step 219, the Licensor 102 transmits a license activation request to the License Server 106. The License Server 106 makes this license available to requesting Platforms 110 in step 220 by marking it as active. The Licensor 102 then distributes the watermarked medium to the Licensee in step 222 and the process ends at step 224.

Figure 3:
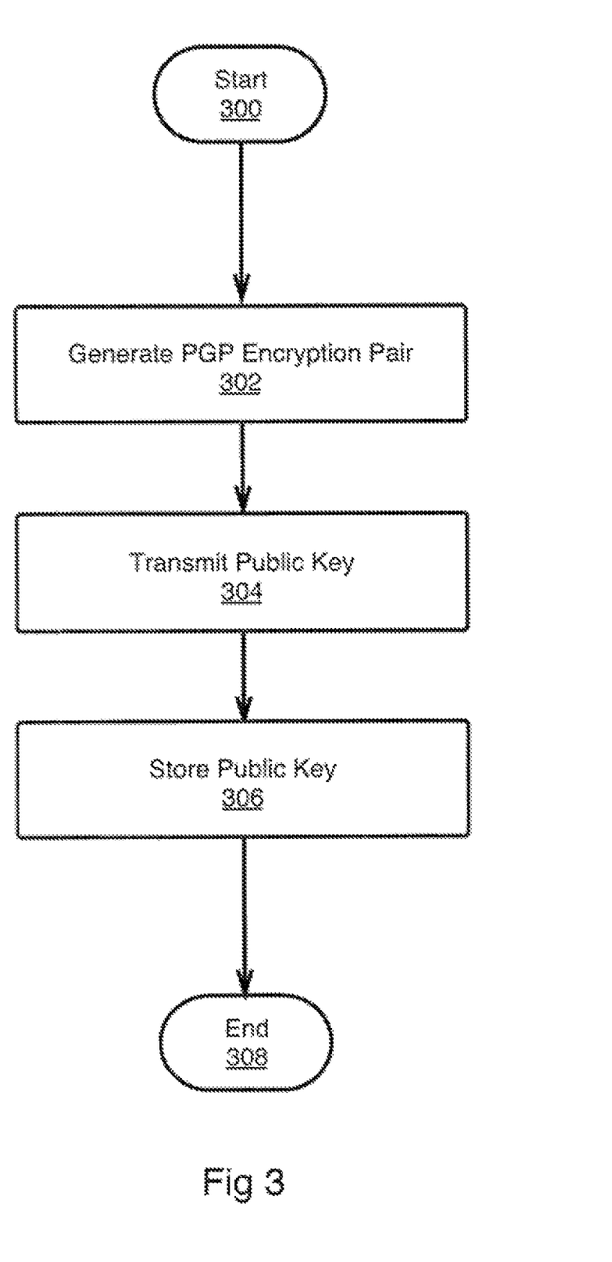
FIG. 3 illustrates a process in which a Platform would make its public OpenPGP key available to Licensors.

FIG. 3 shows the process in which the Platform 110 would make its public OpenPGP key available to Licensors 102. The process begins at a start 300 and, in step 302, the Platform 110 uses any OpenPGP compliant key generation implementation, such as GPG, to generate both a public and private key pair. The Platform 110 then saves the private key for use later when decrypting private encrypted license attributes (described later) and in step 304, transmits the public key to the License Server 106 over the computer network 108. In step 306, the License Server 106 stores the key for retrieval by a Licensor 102 (see FIG. 2 and the accompanying description for the usage of this key), and the process ends at 308.

Figure 4:
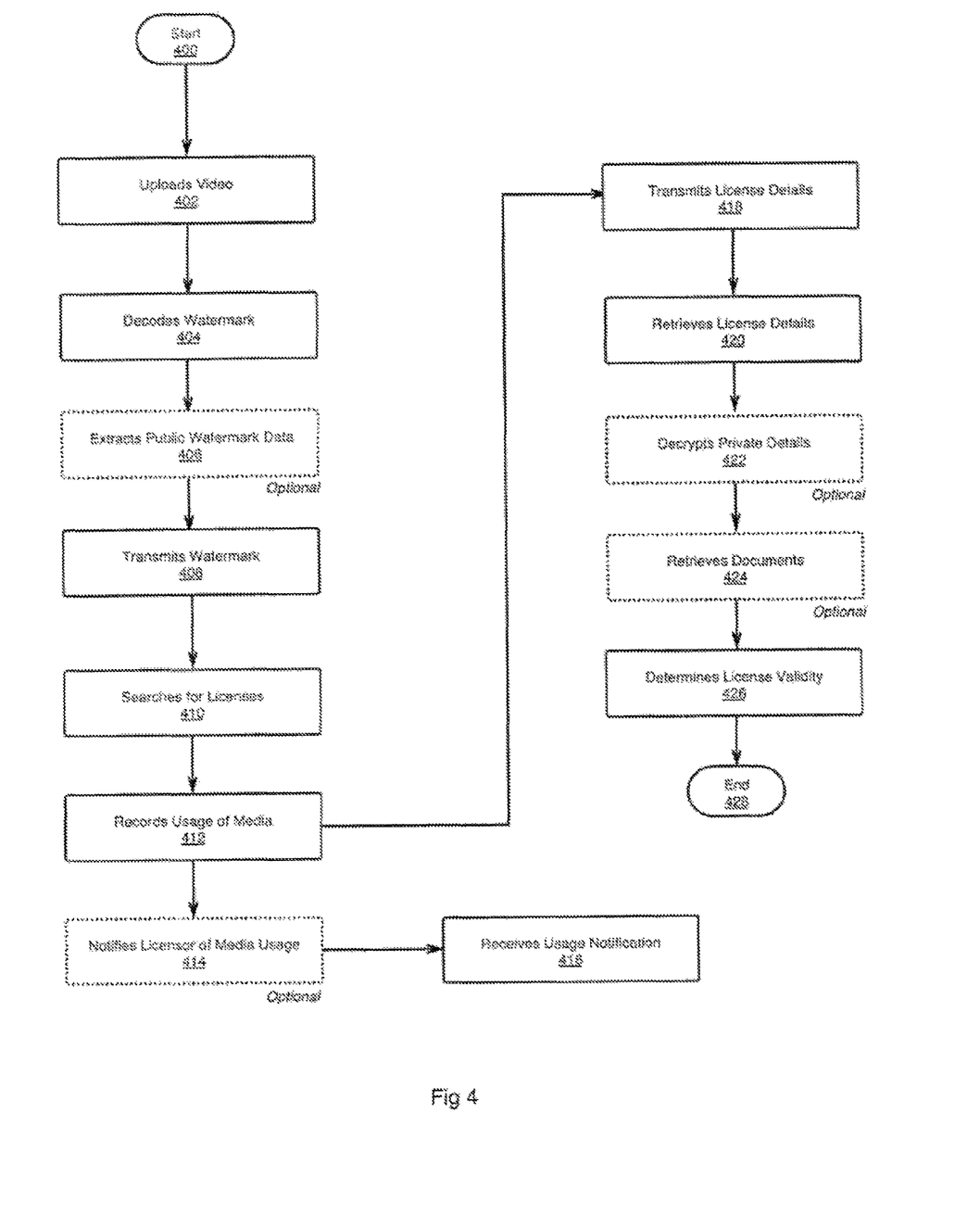
FIG. 4 illustrates a process in which a hosting Platform validates that media have been licensed correctly.

FIG. 4 shows the process in which a hosting Platform 110 validates that media have been licensed correctly. In this aspect of the system 100, the Platform 110 is a video hosting Platform with users who generate content that potentially contains media that have been watermarked in accordance with the present disclosure. Users may create a video using one more audio tracks. Users then upload videos to the Platform 110 and the Platform must make efforts to ensure that audio tracks in the uploaded video are licensed correctly.

At a start 400, a user uploads a video to the Platform 110 in step 402. The Platform 110 then attempts to decode (extract) a watermark from the video in step 404. The watermark decoding software that is used to extract watermarks LIDs must be the complement to the software that was used to encode the watermark into the original audio track.

The Platform 110 can optionally extract the public data that was encoded in the LID bytes in step 406. Using this public data the Platform 110 may be able to determine enough about the licensing rights granted for it to validate the licensing of media. If more information is needed than can be extracted from the public bytes, or if the Platform 110 simply elected to skip step 406, it can then transmit the watermark to the License Server 106 in step 408. In step 410, the License Server 106 then searches for Licenses that have been associated the watermark and, if found, records that the medium was used by the requesting Platform 110 in step 412.

When making the search request, the Platform 110 can optionally include required licensing terms for the medium in question to be considered as having been licensed correctly. If this additional information is included, the License Server 106 attempts to match the terms specified to the terms in the license. The results of this match are returned by the License Server 106 in step 418 in an automated fashion to the Platform 110, along with the license information. The results of the match can then be used to determine if the video posted has incorrectly licensed media.

In step 414, the License Server 106 can optionally notify the Licensor 102 via the computer network 108 that media the Licensor licensed has been reported by the requested Platform 110. The Licensor 102 receives this notification in step 416 and can take appropriate action (e.g., contact licensee in the event of an incorrect license). This notification only occurs if the Licensor 102 has indicated it wishes to receive these notifications. If the Platform 110 included required licensing terms, and there is a violation (i.e., media incorrectly licensed), this information is also reported to the Licensor 102.

In step 420, the Platform 110 receives the license details from the License Server 106. If the Licensor 102 included private encrypted attribute data (data encrypted with the public OpenPGP of this Platform), the Platform 110 decrypts it using the private key of the OpenPGP key pair in step 422. The license data returned from the License Server 106 can also optionally include attached licensing documents or URLs of where those documents are stored and can be retrieved in step 424.

At steps 406, 420, 422, and 424 the Platform 110 may have been able to make a determination of the validity of the licensed media. Each step in FIG. 4 progressively provides additional details about the license. Which steps are performed is dependent on the data provided by the Licensor 102, as well as the amount of detail needed by the Platform 110. At each step the Platform 110 incurs a "cost" which, depending on the embodiment, can also determine how far to proceed in these steps. In step 406 no computer network request was required, so the cost is minimal. For example, however, the details that can be extracted from the watermark bytes may not be enough to make a determination of the license's validity. If this is the case, the next step would require a network request, which for some embodiments might not be acceptable. And on it goes to step 424 when all the license details have been exposed to the Platform 110.

Figure 5:
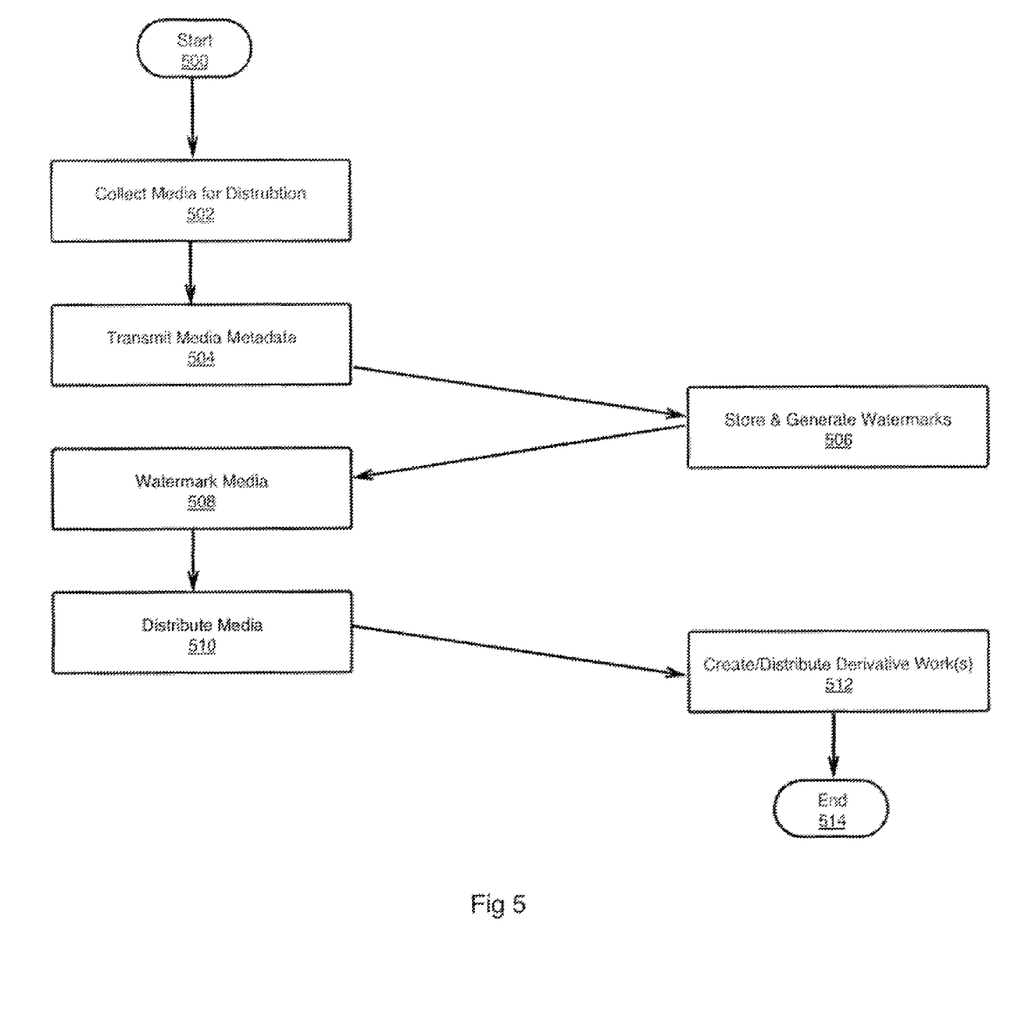
FIG. 5 illustrates a secondary workflow in which media is watermarked and distributed prior to a license being created.

FIG. 5 diagrams the secondary workflow in which media is watermarked and distributed prior to a license being created. The process begins at a start 500 and, in step 502, the Licensor 102 collects the medium that it wishes to distribute to a potential licensee. The Licensor 102 then transmits the metadata about the medium (e.g., name, author, etc.), to the License Server 106 in step 504. The License Server 106 stores the medium's data and generates a watermark unique to that medium. This newly created watermark is sent back to the Licensor 102 who uses it to watermark the medium in step 508. The Licensor 102 then distributes the medium to the Licensee 104 in step 510. The Licensee can then create a derivative work (e.g., create a video with a licensed audio track) in step 512 and the process ends at 514.

Once the Licensor 102 and Licensee 104 agree on licensing terms, the Licensor 102 can create a license with respect to FIG. 2. In addition to sending the license details as described in connect with FIG. 2, the Licensor 102 would also indicate which previously watermarked media should be associated with the license (e.g., which previously watermarked and distributed audio tracks are to be covered by the license agreement).

Thus, the system 100 permits licensing data to be embedded as a watermark in the media itself. The Platform 110 can extract and evaluate the license information provided in the watermark and, if necessary, can progressively more and more license details. The system 100 greatly simplifies the license identification and verification process.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean al least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method for identification and verification of a license comprising:
storing license information related to a work to be licensed by a licensor in a computer data storage structure in association with identification data to uniquely identify the license information;
using at least a portion of the license information to generate watermark data uniquely related to the license information, the watermark data being translatable into information related to at least some attributes of the license such that the watermark data contains at least some attributes of the license in a manner undetectable to unaided human senses and which persists within derivative works;
incorporating the watermark data into the work, the watermark data providing a verification of licensing for the work;
providing the work with the incorporated watermark data to a licensee to permit the creation of a derivative work by the licensee, the derivative work including the watermark data;
providing the derivative work, including the watermark data, to a publishing entity for release to the general public; and
a platform decoding the watermark data in the derivative work prior to the release to the general public to verify the license based solely on the attributes of the license contained in the watermark data wherein the license is verified for the publishing entity by the platform prior to the release of the derivative work to the general public.

2. The method of claim 1 wherein the attributes of the license contained within the watermark data provides basic license information comprising licensor identification, media rights type, license duration, and geographic limits.

3. The method of claim 1, further comprising:
the platform decoding the watermark data and transmitting the watermark data to a license verification entity to thereby request additional license information;
the license verification entity using the transmitted watermark data to retrieve at least a portion of the license information stored in the computer data storage structure in association with identification data to uniquely identify the license information; and
providing the retrieved license information to the platform in response to its request for additional license information.

4. The method of claim 1 wherein selected license attributes are required for verification and are provided in an unencrypted form.

5. The method of claim 1 wherein selected license attributes are private, the method further comprising encrypting the private license attributes.

6. The method of claim 1 wherein selected license attributes are private, the method further comprising providing the private license attributes only to a pre-identified requestor.

7. The method of claim 1, further comprising activating the license following incorporating the watermark data into the licensed work wherein providing the work to the licensee comprises providing the licensed work with the activated license.

8. The method of claim 1 wherein providing the derivative work for publication comprises providing the derivative work to the platform.

9. The method of claim 1 wherein providing the derivative work for publication comprises providing the derivative work to a third party publisher, and the platform is a third party monitoring service.

\* \* \* \* \*

UNITED STATES PATENT AND TRADEMARK OFFICE
CERTIFICATE OF CORRECTION

PATENT NO. : 9,722,978 B2
APPLICATION NO. : 14/221002
DATED : August 1, 2017
INVENTOR(S) : Charles Hughes Morss et al.

It is certified that error appears in the above-identified patent and that said Letters Patent is hereby corrected as shown below:

In the Specification

At Column 3, Lines 26-37 currently reads as:
To discover additional license information, the Platform can use the digital watermark to query the License Server for additional information. As noted above, the digital watermark data also includes information that uniquely identifies the particular license. This identification information can be used during communications with the License Server to discover the additional license derail. Such information may include, but is not limited to, information about the Licensee, the works to which the license applies, and information on the particular media being licensed, such as an audio track name, international standard recording code (ISRC), artist name, and the like.

Should read as:
To discover additional license information, the Platform can use the digital watermark to query the License Server for additional information. As noted above, the digital watermark data also includes information that uniquely identifies the particular license. This identification information can be used during communications with the License Server to discover the additional license detail. Such information may include, but is not limited to, information about the Licensee, the works to which the license applies, and information on the particular media being licensed, such as an audio track name, international standard recording code (ISRC), artist name, and the like.

At Column 3, Lines 38-46 currently reads as:
In yet another level of progressive license discovery, the Platform can request the actual license documents from the Licensing Server. These documents are typically the actual legal documents between the Licensor and the Licensee that describe all rights and restrictions granted in the license. Portions of the license information returned from the license Server in response to Platform queries may be encrypted by the Licensor. The Platform can optionally decrypt this information to gain further details.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,722,978 B2

Should read as:

In yet another level of progressive license discovery, the Platform can request the actual license documents from the Licensing Server. These documents are typically the actual legal documents between the Licensor and the Licensee that describe all rights and restrictions granted in the license. Portions of the license information returned from the License Server in response to Platform queries may be encrypted by the Licensor. The Platform can optionally decrypt this information to gain further details.